(12) United States Patent
Kranz

(10) Patent No.: US 7,710,239 B2
(45) Date of Patent: May 4, 2010

(54) REMOTE COMMUNICATION DEVICE AND SYSTEM FOR COMMUNICATION

(75) Inventor: Mark J. Kranz, Hallsville, TX (US)

(73) Assignee: Stemco LLC, Longview, TX (US)

( * ) Notice: Subject to any disclaimer, the term of this patent is extended or adjusted under 35 U.S.C. 154(b) by 610 days.

(21) Appl. No.: 10/861,119

(22) Filed: Jun. 4, 2004

(65) Prior Publication Data

US 2004/0246100 A1 Dec. 9, 2004

Related U.S. Application Data

(60) Provisional application No. 60/476,541, filed on Jun. 6, 2003.

(51) Int. Cl.
*H04Q 5/22* (2006.01)
(52) U.S. Cl. ............ 340/10.1; 340/825.58; 340/825.72; 340/825.73; 340/5.61
(58) Field of Classification Search ................ 340/10.1, 340/825.69, 825.72, 10.4, 10.2, 10.32, 10.5, 340/10.3, 825.58, 825.73, 825.731, 10.6; 370/320; 455/375, 17, 23, 154.1
See application file for complete search history.

(56) References Cited

U.S. PATENT DOCUMENTS

| | | | | | |
|---|---|---|---|---|---|
| 3,781,794 | A | * | 12/1973 | Morris | ........................ 714/822 |
| 5,218,343 | A | * | 6/1993 | Stobbe et al. | ............. 340/573.4 |
| 5,451,958 | A | * | 9/1995 | Schuermann | ................. 342/42 |
| 6,097,301 | A | * | 8/2000 | Tuttle | ....................... 340/693.9 |
| 6,107,910 | A | * | 8/2000 | Nysen | ........................ 340/10.1 |
| 6,192,222 | B1 | * | 2/2001 | Greeff et al. | ................. 455/106 |
| 6,582,105 | B1 | * | 6/2003 | Christensen | ................. 362/385 |
| 6,617,963 | B1 | * | 9/2003 | Watters et al. | ........... 340/10.41 |
| 7,295,115 | B2 | * | 11/2007 | Aljadeff et al. | .......... 340/572.1 |
| 2002/0149484 | A1 | | 10/2002 | Carrender | |
| 2003/0099210 | A1 | | 5/2003 | O'Toole et al. | |

FOREIGN PATENT DOCUMENTS

| EP | 0917 088 A2 | 5/1999 |
|---|---|---|
| WO | WO 01/95243 A2 | 12/2001 |

OTHER PUBLICATIONS

International Search Report mailed Oct. 28, 2004 corresponding to PCT/US2004/017919.
Wilson, Stephen. "Digital modulation and coding", 1996, Prentice Hall, NJ, XP-002300544, p. 256-265.

* cited by examiner

*Primary Examiner*—Vernal U Brown
(74) *Attorney, Agent, or Firm*—Holland & Hart LLP

(57) ABSTRACT

Remote communication devices (i.e., radio frequency identification (RFID) tag) and systems for communicating between one or more RFID tags and a reader using a frequency modulation method to encode binary data are disclosed herein. For example, a remote communication device includes an antenna operable to receive and backscatter a carrier signal, wherein the backscattered carrier signal further comprises a secondary signal within an identification bandwidth. The remote communication device also includes a signal processing circuit coupled to the antenna, the signal processing circuit comprising at least one encoding circuit operable to encode binary data into the backscattered carrier signal by periodically modulating the frequency of the secondary signal from one encoding frequency to another one of $2^n+1$ encoding frequencies within the identification bandwidth, wherein n is an integer greater than or equal to 1.

39 Claims, 3 Drawing Sheets

REMOTE COMMUNICATION DEVICE AND SYSTEM FOR COMMUNICATION

STATEMENT OF RELATED APPLICATION

The present application claims priority under 35 U.S.C. §119(e) from U.S. Provisional Application Ser. No. 60/476,541, filed Jun. 6, 2003, entitled "Frequency Hopping RFID Tags," the disclosure of which is incorporated herein by reference.

FIELD OF THE INVENTION

The present invention relates to radio frequency (RF) devices and systems for communicating between one or more RF devices and a reader.

BACKGROUND OF THE INVENTION

Remote communication using wireless equipment may rely on radio frequency (RF) technology. One application of RF technology is in locating, identifying, and tracking objects, such as animals, inventory, and vehicles. Other applications of RF technology may include communication of data collected from remote sensors.

RF identification (RFID) tag systems have been developed to facilitate monitoring of remote objects and communication of data collected from remote sensors. As shown in FIG. 1, a basic RF tag system 10 may include three components, an antenna 12, a transceiver with decoder 14, and a transponder (commonly called an RFID tag) 16. In operation, the antenna 12 may emit electromagnetic radio signals generated by the transceiver 14 to activate the RFID tag 16. When the RFID tag 16 is activated, data can be read from or written to the RFID tag 16.

In some applications, the antenna 12 may be a component of the transceiver and decoder 14 to become an interrogator (or reader) 18. The reader 18 may activate or "wake up" the RFID tag 16 by radiating energy to the tag in an on/off pattern encoded in some time varying manner. When an RFID tag 16 passes through the electromagnetic radio waves 20, the RFID tag 16 detects the signal 20 and is activated. An example of one manner commonly used to activate an RFID tag is biphase encoding. When the reader 18 is done talking to the RFID tag 16, the reader 18 may then go to a continuous broadcast of energy that the RFID tag 16 uses to communicate information to the reader via backscatter methodologies. Data encoded in the RFID tag 16 may be communicated to the reader 18 by a data signal 22 through an antenna 23. The RFID tag 16 may modulate its antenna and put a subcarrier on the reader's backscattered carrier signal that could later be stripped off and demodulated. The subcarrier may use a time varying amplitude shifting modulation technique such as biphase modulation to encode the data into the subcarrier signal.

RFID tag communication systems may include systems where the RFID tags return data at a specific frequency associated with each RFID tag. For example, a reader may transmit a signal at one frequency, and each RFID tag can modulate the amplitude of its signal at a frequency separate from the frequency of any other RFID tag in the system. Such systems can allow the reader to simultaneously differentiate information received from multiple RFID tags. Further, the RFID tags may be configured to allow a tag to communicate at one of several frequencies and to adaptively avoid interference with other tags that may be communicating on an identical frequency. While an RFID tag may adaptively change the frequency at which it is communicating, the means for communicating information still relies on a method of modulating the amplitude of a signal in some time varying fashion to encode data in the signal.

Several disadvantages may be associated with encoding a signal from an RFID tag by modulating the amplitude of a signal in some time varying fashion. For a reader to decode a time varying amplitude modulated system, it may be required to accurately identify the amplitude change times. To accurately identify an amplitude change time, a minimum signal to noise threshold may need to be maintained to clearly detect the edge of an amplitude change. A reader may be required to sample the returned signal at some rate higher than twice the data bandwidth such as 10 times the data bandwidth. The reader may obtain little processing gain from averaging the signal sampled since signal averaging can smear the edges of amplitude changes and can raise the sample requirements further.

Thus, it would therefore be desirable to have a system and method for communicating between one or more RF tags and a reader such that the data transfer rate may be increased, and the error rate may decrease. It would be desirable to increase the data transfer rate and decrease the error rate without significantly raising the cost of a system. Further, it would be desirable to have a system and method for communicating between one or more RF tags and reader such that multiple RF tags can communicate with the reader simultaneously.

SUMMARY OF INVENTION

The present invention provides a remote communication device (i.e., radio frequency identification (RFID) tag) and system for communicating between one or more RFID tags and a reader using a frequency modulation method to encode binary data.

The present invention provides a remote communication device comprising: an antenna operable to receive and backscatter a carrier signal, wherein the backscattered carrier signal further comprises a secondary signal within an identification bandwidth; and a signal processing circuit coupled to the antenna, the signal processing circuit comprising at least one encoding circuit operable to encode binary data into the backscattered carrier signal by periodically modulating the frequency of the secondary signal from one encoding frequency to another one of $2^n+1$ encoding frequencies within the identification bandwidth, wherein n is an integer greater than or equal to 1.

The present invention also provides a reader comprising: an antenna operable to receive a plurality of backscattered signals from a plurality of remote communication devices, wherein each backscattered signal comprises a carrier signal and a secondary signal, wherein the secondary signal comprises a series of up to $2^n+1$ encoding frequencies within an identification bandwidth; and a receiving circuit coupled to the antenna operable to extract data from each of the backscattered signals by converting a change from one encoding frequency to another encoding frequency in the secondary signal of each backscattered signal into n bits of binary data, wherein n is an integer greater than or equal to 1.

The present invention also provides a communication system comprising: a plurality of remote communication devices, wherein each remote communication device comprises: a remote communication device antenna operable to receive and backscatter a carrier signal, wherein the backscattered carrier signal further comprises a secondary signal within an identification bandwidth; and a signal processing circuit coupled to the remote communication device antenna, the signal processing circuit comprising at least one encoding circuit operable to encode binary data into the backscattered carrier signal by periodically modulating the frequency of the secondary signal from one to another one of $2^n+1$ encoding frequencies within the identification bandwidth, and a reader comprising: a reader antenna operable to receive the plurality of backscattered carrier signals from the plurality of remote communication devices, and a receiving circuit coupled to the reader antenna operable to extract data from each of the backscattered carrier signals by converting change from one encoding frequency to another encoding frequency in the secondary signal of each backscattered carrier signal into n bits of binary data, wherein n is an integer greater than or equal to 1.

The present invention also provides a method for communication between a remote communication device and a reader comprising: transmitting a carrier signal; receiving the carrier signal at a remote communication device; backscattering the carrier signal wherein the backscattered carrier signal further comprises a secondary signal within an identification bandwidth; encoding binary data into the backscattered signal by periodically modulating the secondary signal from one to another one of $2^n+1$ encoding frequencies within the identification bandwidth, wherein n is an integer greater than or equal to 1; receiving the backscattered carrier signal from the remote communication device at a reader; and extracting data from the backscattered carrier signal.

The present invention also provides a method for communication between a plurality of remote communication devices and a reader comprising: transmitting a carrier signal; receiving the carrier signal at a plurality of remote communication devices; backscattering the carrier signal at each remote communication device, wherein the backscattered carrier signal further comprises a secondary signal within an identification bandwidth; encoding binary data into the backscattered signal by periodically modulating the secondary signal from one to another one of $2^n+1$ encoding frequencies within the identification bandwidth, wherein n is an integer greater than or equal to 1; receiving the backscattered signals from each remote communication device; and extracting data from each remote signal.

A potential advantage of the present invention is that the remote communication device may not be required to turn its carrier on and off in a biphase modulation technique to avoid interference with other remote communication devices. Rather, the remote communication device may use a frequency-hopping carrier to communicate back to the reader.

Another potential advantage of the present invention is the potential lack of interference between multiple devices in a RF system since each remote communication device in a system may be assigned a separate identification bandwidth.

Another potential advantage to the system of the present invention is that the system may allow the reader to effectively use oversampling, decimation, and averaging to increase the processing gain with no loss in data detection. Low signal to noise levels can be processed once the initial lock on a remote communication device's signal is made because the reader can then predict the range of possible frequencies (encoding frequencies) of the signal. The reader may then zoom in for a very narrowband view of the identification bandwidth and the encoding frequencies contained therein.

The demodulation technique for one backscattered signal may be used to extract data from the other backscattered signals received by the reader from the remote communication devices and thereby potentially simplifying the system's computing requirements.

Another advantage of the present system may include an overall increase in the data rate or the corresponding symbol rate may be reduced if data communications rates do not need to increase.

DETAILED DESCRIPTION

The present invention provides a remote communication device (i.e., radio frequency identification (RFID) tag). The present invention also provides a system for communicating between one or more RF tags and a reader using a frequency modulation method to encode binary data.

Figure 1:
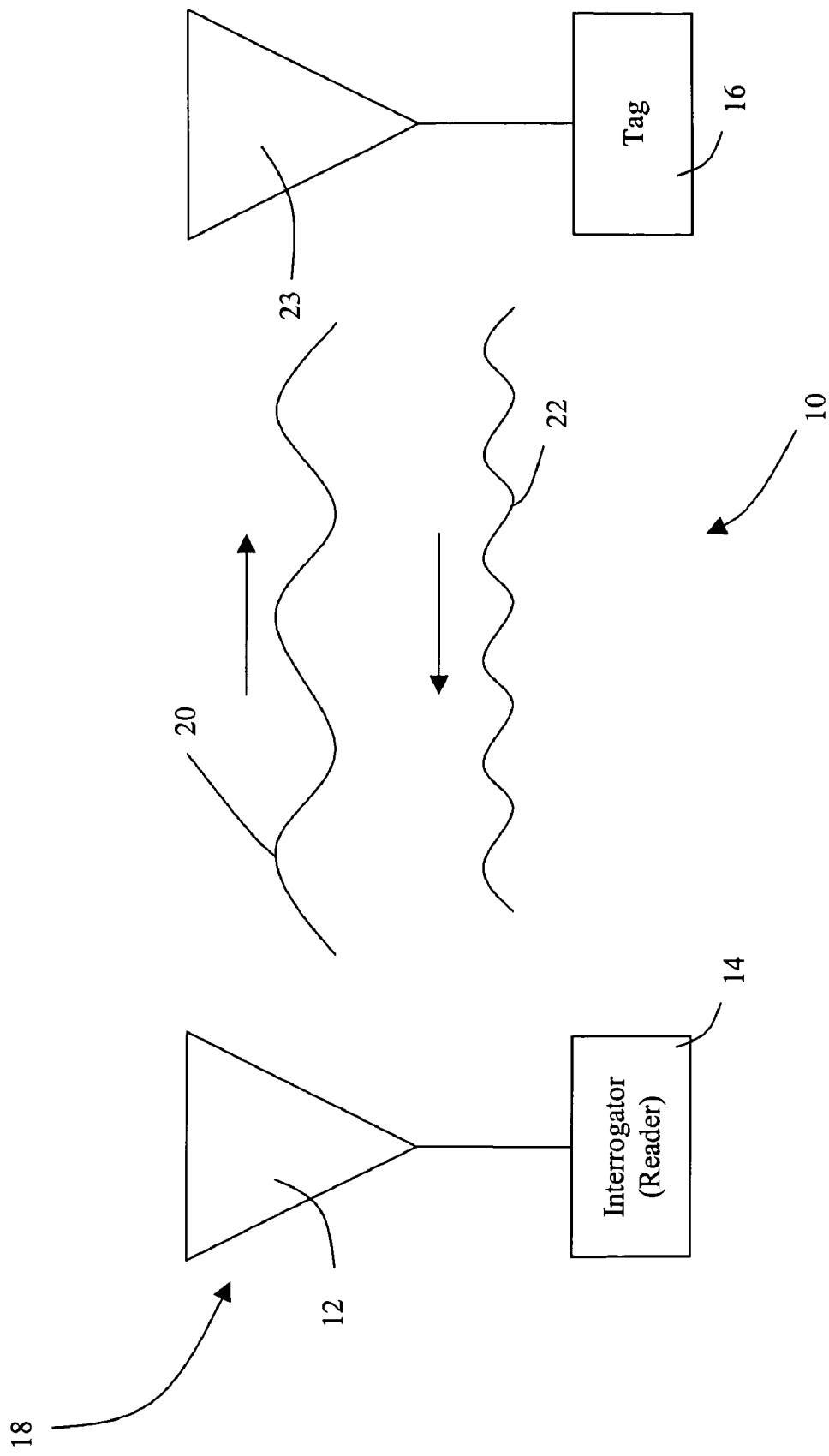
FIG. 1 is a diagram of an RF tag system.
Figure 2:
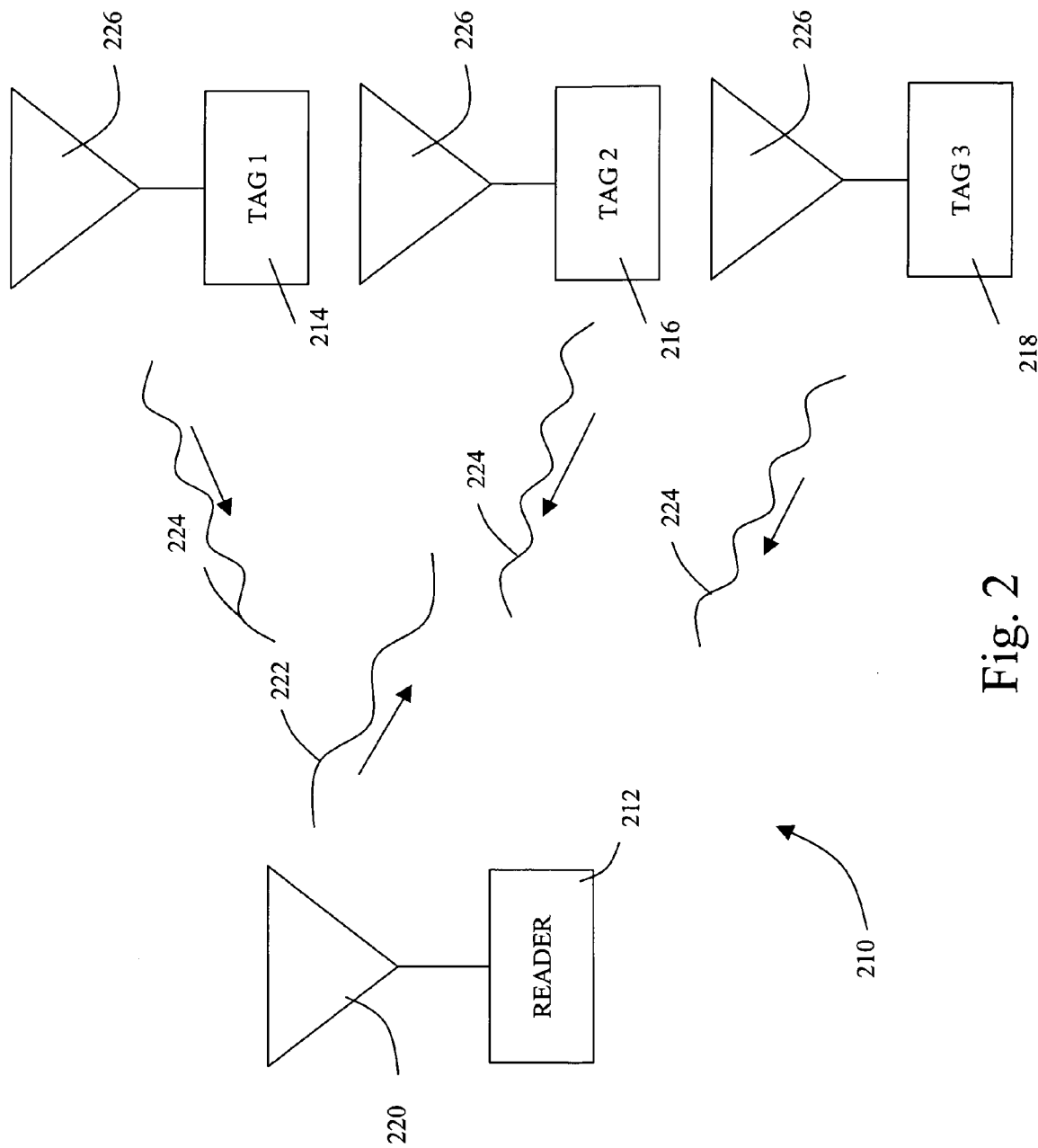
FIG. 2 is a diagram of one embodiment of a communication system of the present invention.

In one aspect, the present invention provides a communication system comprising a plurality of remote communication devices and a reader. Referring now to FIG. 2, a diagram of one embodiment of a communication system of the present invention is illustrated. The communication system 210 comprises a reader 212 and a plurality of remote communication devices 214, 216, and 218.

Each remote communication device 214, 216, and 218 within the system 210 comprises: a remote communication device antenna 226 operable to receive and backscatter a carrier signal 222. The backscattered carrier signal 224 comprises the carrier signal and a secondary signal within an identification bandwidth. The remote communication devices 214, 216, and 218 further comprise a signal processing circuit coupled to the remote communication device antenna 226. The signal processing circuit comprises at least one encoding circuit operable to encode binary data into the backscattered carrier signal by periodically modulating the frequency of the secondary signal from one encoding frequency to another encoding frequency of $2^n+1$ encoding frequencies within the identification bandwidth, wherein n is an integer greater than or equal to 1.

The reader 212 comprises a reader antenna 220 operable to receive a plurality of backscattered carrier signals 224 backscattered from the plurality of remote communication devices 214, 216, and 218. The reader 212 further comprises a receiving circuit coupled to the reader antenna 220 operable to extract data from each of the backscattered carrier signals 224 by converting into n bits of binary data a change from one encoding frequency to another encoding frequency of each backscattered carrier signal 224.

Although three remote communication devices 214, 216, and 218 are illustrated, the system 210 may comprise any number of remote communication devices.

In an embodiment, the receiving circuit of the reader 212 may be operable to extract data simultaneously from each of the backscattered signals 224. In another embodiment, the receiving circuit of the reader 212 may comprise at least one processing circuit operable to extract data from each of the backscattered signals 224, wherein each at least one processing circuit is operable to process a secondary signal within a predetermined identification bandwidth.

In another embodiment, the reader 212 may further comprise a transmitting circuit coupled to the reader antenna 220, wherein the transmitting circuit is operable to transmit a carrier signal 222 to the plurality of remote communication devices 214, 216, and 218. In another embodiment, the reader antenna 220 may comprise a transmitting antenna coupled to a transmitting circuit and a receiving antenna coupled to the receiving circuit. In another embodiment, the transmitting circuit is operable to transmit a carrier signal 222 that regularly hops to a different frequency.

In another embodiment, the carrier signal 222 and the backscattered carrier signal 224 may comprise radio frequency signals.

In another embodiment, the remote communication device antenna 226 and the signal processing circuit of the remote communication devices may be configured to generate a supply voltage from the carrier signal.

In another embodiment of the communication system 210, the signal processing circuit of the remote communication devices may be further operable to activate and deactivate upon receipt of remote activation and deactivation signals, respectively.

In another embodiment of the communication system 210, the remote communication devices 214, 216, and 218 may further comprise a sensor coupled to the signal processing circuit, wherein the signal processing circuit is further operable to receive a sensor signal from the sensor, encode the sensor signal, and include the encoded sensor signal in the secondary signal of the backscattered carrier signal 224.

As used herein, an identification bandwidth is defined as the range in possible frequencies that a secondary signal backscattered from a remote communication device may be. For example, an identification bandwidth associated with a particular remote communication device may be from 1.968 MHz to 2.032 MHz. As a result, any secondary signals backscattered by a remote communication device in the range from 1.968 MHz to 2.032 MHz would be associated with that particular remote communication device.

The encoding frequencies within an identification bandwidth are a set of $2^n+1$ frequencies at which the secondary signal modulates for a time interval before changing to another encoding frequency. In an embodiment where hardware and software costs associated with processing and decoding a backscattered secondary signal may need to be optimized, the time interval between changes from one encoding frequency to another encoding frequency may be fixed. Thus, the secondary signal periodically changes from one encoding frequency to another encoding frequency within an identification bandwidth. In an embodiment, an encoding frequency may be coterminous with the upper or lower end of an associated identification bandwidth. For example, an identification bandwidth from 1.968 MHz to 2.032 MHz may have an encoding frequency at 2.032 MHz and/or at 1.968 MHz. In another embodiment, each of a set of $2^n+1$ encoding frequencies may fall inside of the upper and lower end of an associated bandwidth.

The signal processing circuit of the remote communication devices of the present invention comprise at least one encoding circuit operable to encode binary data into the backscattered carrier signal by periodically changing the frequency of the secondary signal from one encoding frequency to another of $2^n+1$ encoding frequencies within an identification bandwidth. For example, in an embodiment, an identification bandwidth associated with a particular remote communication device may be from 1.968 MHz to 2.032 MHz. Five encoding frequencies (i.e., n=2) may be distributed within the identification bandwidth with about 16 kHz between each encoding frequency such that the encoding frequencies are located at about 1.968 MHz, 1.984 MHz, 2.000 MHz, 2.016 MHz, and 2.032 MHz. After a fixed period, such as 1 milli-second, the secondary signal changes from the encoding frequency at which it is modulating to another encoding frequency within the set of 5 encoding frequencies. The change from one encoding frequency to another encoding frequency is used to encode binary data into the secondary signal.

Any combination of difference in frequency between encoding frequencies, the number of encoding frequencies within an identification bandwidth, and size of an identification bandwidth for a particular remote communication device may be used so long as the different encoding frequencies with an identification bandwidth can be distinguished by the reader. For embodiments of the system of the present invention, the difference in frequency between encoding frequencies, the number of encoding frequencies within an identification bandwidth, and size of an identification bandwidth may be determined by one or more considerations such as, but not limited to, cost, the likelihood of other signals interfering with the secondary signal, complexity of hardware or software necessary to encode and decode binary data into and out of the secondary signal, processing power of reader, the desired number of bits per symbol, and the number of channels on which the reader receives backscattered signals. For example, the cost and complexity of the hardware and software of a system could be expected to increase with increasing numbers of encoding frequencies (i.e., increasing n) within an identification bandwidth. Systems not needing to communicate a large amount of data per symbol may have 3 or 5 encoding frequencies within an identification bandwidth, and thereby potential reduce the cost of the system. Systems needing to communicate a larger amount of data per symbol may have 9 or 17 encoding frequencies within an identification bandwidth. Other considerations may determine the number of encoding frequencies within an identification bandwidth. In one non-limiting embodiment where the number remote communication devices within a system is four or less and working with a handheld application with a read time of 100 milliseconds it may be desirable to encode 2 bits with each change in encoding frequency.

Prior to communicating data to the reader through the backscattered secondary signal, an initialization sequence may occur. An initialization sequence may be used to communicate to the reader what the identification bandwidth is and at what frequency each encoding frequency is for a remote communication device. Upon receiving a wake up signal and waking up, a remote communication device may sequence through each encoding frequency in a backscattered secondary signal. In an embodiment, each communication device within a system may go through an initialization sequence before communicating information to the reader. Since environmental conditions, such as temperature, may change the frequency of each encoding frequency within a set of encoding frequencies associated with a remote communication device, the initialization sequence can insure that the reader will know at what frequencies to expect to receive secondary signals. Further, an initialization sequence may be used to reduce cost of system by reducing the required processing capability of the reader.

Additionally, the set of encoding frequencies assigned to a particular remote communication device can be changed. In one embodiment of the present invention, the reader may transmit a global command to remote communication devices operating in a continuous area of the global command signal and instruct the devices to each use a different set of encoding frequencies based on a random jump. In addition, the identification bandwidth associated with any and all of the remote communication devices may be changed with a global command signal. This may allow a reader to switch a remote communication device's set of encoding frequencies or identification bandwidth if interference from another remote communication device or RF source is detected on any remote communication device's set of encoding frequencies.

Due to wave effects, a change in the relative distance between the reader, a transmitter, and/or a remote communication device may cause deconstructive interference or signal canceling between the carrier signal and the backscattered carrier signal. Signal canceling creates a null when the relative distance between the reader, a transmitter, and/or a remote communication device changes by ½ of the wavelength of the carrier signal. Furthermore, large changes in signal strength can occur when the relative distance between a reader, a transmitter, and/or a remote communication device changes by ¼ of the wavelength of the carrier signal. As a result, it may be desirable in embodiments to communicate a complete symbol within a period less than the period one would expect a reader, transmitter, and/or remote communication device to move ¼ the carrier wavelength. For example, a hand held reader transmitting a carrier signal at 2.44 GHz could be expected to travel more than ¼ the carrier wavelength in 50 to 100 milliseconds. At the same carrier frequency, a remote communication device on a vehicle traveling at 20 mph could be expected to travel more than ¼ the carrier wavelength in a fraction of a millisecond.

To potentially avoid cancellation of the signal resulting from relative movement, the carrier signal of the system may hop from one frequency to another. The period between a hop from one carrier signal frequency to another carrier signal frequency may be determined by application specific considerations such as, but not limited to, the expected speed of relative movement between a reader, transmitter, and/or a remote communication device, the frequency range of the carrier signal, and the amount of data to communicate (i.e., number of bits per symbol) in the backscattered signal during the period between each carrier signal hop.

In systems where the carrier signal is regularly hopping from one frequency to another, the rate at which the secondary signal is modulated from one encoding frequency to another may be directly related to the amount of data per symbol and inversely related to the length of the period between carrier signal hops. For example, if a large amount of data is included in each symbol, the rate at which the secondary signal modulates from one encoding frequency to another may be high. If the same amount of data is included in each symbol, the rate at which the secondary signal modulates from one encoding frequency to another may be decreased if the period between hops in the carrier frequency is increased.

Other methods may be used to potentially avoid a null sign resulting from relative movement in the communication system such as, but not limited to, phase shifting the backscattered signal at the reader before mixing with the carrier signal.

As described above, the frequency of the secondary signal backscattered from a remote communication device of the present invention is periodically changed from one encoding frequency to another of $2^n+1$ encoding frequencies within an identification bandwidth. Data may be encoded into the secondary signal according a number of methods. A particular method used to encode data may be determined by considerations such as, but not limited to, the processing speed of the signal encoder and decoder, number of remote communication devices within the system, and the number of bits of data communicated with each change from one encoding frequency to another.

In an embodiment, where n=2, two bits of binary data can be encoded into changes from one to another one of 5 encoding frequencies (F1, F2, F3, F4, and F5) where the distance between any two adjacent encoding frequencies is about $\Delta F$. For example, a change of $+\Delta F$ from one encoding frequency to another encoding frequency (such as from F2 to F3, or from F4 to F5) would always encode the same two bits of binary data. Similarly, a change of $+2(\Delta F)$ would always encode the same two bits of binary data. The binary data encoded by each possible change in encoding frequencies (i.e., $+\Delta F$, $-\Delta F$, $+2\Delta F$, and $-2\Delta F$) would also be exclusive of each other.

In the case where the secondary signal is modulating at the upper end of the bandwidth (i.e., F5) and encoding the next piece of binary data requires a change of $+\Delta F$, the encoding method may continue with the lowest encoding frequency in the bandwidth (i.e., F1), thereby allowing the secondary signal to "scroll" though the encoding frequencies within the identification bandwidth associated with the remote communication device such that there are always two encoding frequencies "up" and two encoding frequencies "down" that correspond to predetermined sets of binary information. In another embodiment, binary data may be encoded in an method where three bits of data may be communicated through the use of nine encoding frequencies within an identification bandwidth.

In another embodiment, binary data may be encoded into the secondary signal backscattered from a remote communication device through the use of an encryption method where each change from one encoding frequency to another encoding frequency may be determine by a serial code such that communications could be encrypted.

In another embodiment, the remote communication devices of the present invention may further comprise a sensor. The sensor may be coupled to the signal processing circuit, wherein the signal processing circuit is further operable to receive a sensor signal from the sensor, encode the sensor signal, and include the encoded sensor signal in the secondary signal. As used herein, a sensor includes any device that senses either the absolute value of or a change in a physical quantity such as, but not limited to, temperature, pressure, intensity of light, and acceleration. For example, any pressure sensor known in the art may be used in the practice of the present invention as long as it may be functionally connected to a remote communication device. In an embodiment, a pressure sensor may comprise a piezoelectric pressure sensor in which a voltage is applied across a diaphragm coated with piezo crystals. Those skilled in the art will recognize other pressure sensing means which may be employed in the various embodiments of the present invention without altering the spirit or scope of the present invention.

In another embodiment of the present invention, the reader may be coupled to a display device or other user interface that allows a user to visually observe data communicated and decoded from one or more remote communication devices.

In another aspect, the present invention provides a method for communicating between a remote communication device and a reader comprising: transmitting a carrier signal; receiving the carrier signal at a remote communication device; backscattering the carrier signal wherein the backscattered carrier signal further comprises a secondary signal within an identification bandwidth; encoding binary data into the backscattered signal by periodically modulating the secondary signal from one to another one of $2^n+1$ encoding frequencies within the identification bandwidth, wherein n is an integer greater than or equal to 1; receiving the backscattered carrier signal from the remote communication device at a reader; and extracting data from the backscattered carrier signal. In an embodiment, the step of extracting data from the backscattered carrier signal may comprise removing the carrier signal from the backscattered carrier signal and converting each change from one encoding frequency to another encoding frequency in the secondary signal into n bits of data. In another embodiment, the binary data encoded into the backscattered carrier signal may be provided by a sensor. In another embodiment, the step of transmitting a carrier signal may comprise regularly hopping the carrier signal to a different frequency.

In another aspect, the present invention provides a method for communicating between a plurality of remote communication devices and a reader comprising: transmitting a carrier signal; receiving the carrier signal at a plurality of remote communication devices; backscattering the carrier signal at each remote communication device, wherein the backscattered carrier signal further comprises a secondary signal within an identification bandwidth; encoding binary data into the backscattered signal by periodically modulating the secondary signal between one of $2^n+1$ encoding frequencies within the identification bandwidth, wherein n is an integer greater than or equal to 1; receiving the backscattered signals from each remote communication device; and extracting data from each remote signal.

The devices systems and methods of embodiments of the present invention may use standard RFID hardware technology known to those of ordinary skill in the art. Hardware methodologies can vary greatly within the scope of the present invention, but the principle of going to a frequency shifting modulation from a time varying amplitude shifting can be applied to numerous hardware configurations.

For example, commercially available microcontrollers such as, but not limited to, an MSP 430 series of microcontrollers from Texas Instruments include an on board ring or RC oscillator that can be adjusted in fine steps. The oscillator can act as the drive for the modulation circuit on a remote communication device. By using an oscillator that can be adjusted in small enough steps, one can create a frequency hopping methodology with no external components. Further, a system using biphase encoding in an on/off carrier fashion can be modified and configured to backscatter a carrier signal and encode data into the carrier signal using methods of the present invention. Using pre-existing hardware and systems can reduce the cost of the system. More data may be communicated faster by employing the frequency hopping method of the present invention relative to amplitude modulating biphase encoding methods.

As described above, the system, devices, and methods of the present invention may eliminate the need for a reader to discern and decode the modulations on the incoming signal to retrieve data. In the present system, the reader may only need to identify that a backscattered secondary signal is being received at one of a set of encoding frequencies. In an embodiment where n=2, if a backscattered secondary signal is detected, the reader has received two bits of data corresponding to the new encoding frequency's relationship to the previous encoding frequency.

Since each remote communication device within a system may have a separate identification bandwidth, the reader may be able to identify which remote communication device is communicating. In embodiments where each remote communication device within a system communicates within a different identification bandwidth, the system may also allow multiple remote communication devices to talk simultaneously without interference.

The system may also be used at longer ranges because the remote communication device may have relaxed carrier to noise requirements. Since the reader may need only to find coherent energy at some predefined locations (i.e., encoding frequencies), this can allow for more averaging and filtering. The strength of the backscattered signal received by the reader may not have to be decipherable in that the back scattered signal's amplitude modulations do not have to be decoded. The reader may merely look for a signal at the predetermined frequencies (i.e., encoding frequencies) for that remote communication device. When a signal at one of the predetermined frequencies is detected, the reader is able to determine which remote communication device is communicating.

Since the symbol rate can drop for any given data rate, the spectral analysis routines may be allowed more time to define the spectrum thus giving more processing gain. Processing time may also be reduced because it is possible to process very near to the symbol rate as opposed to several times the data rate in a biphase on/off carrier type scheme. The symbol rate can drop because multiple bits can be encoded per symbol.

EXAMPLES

Example 1

Figure 3:
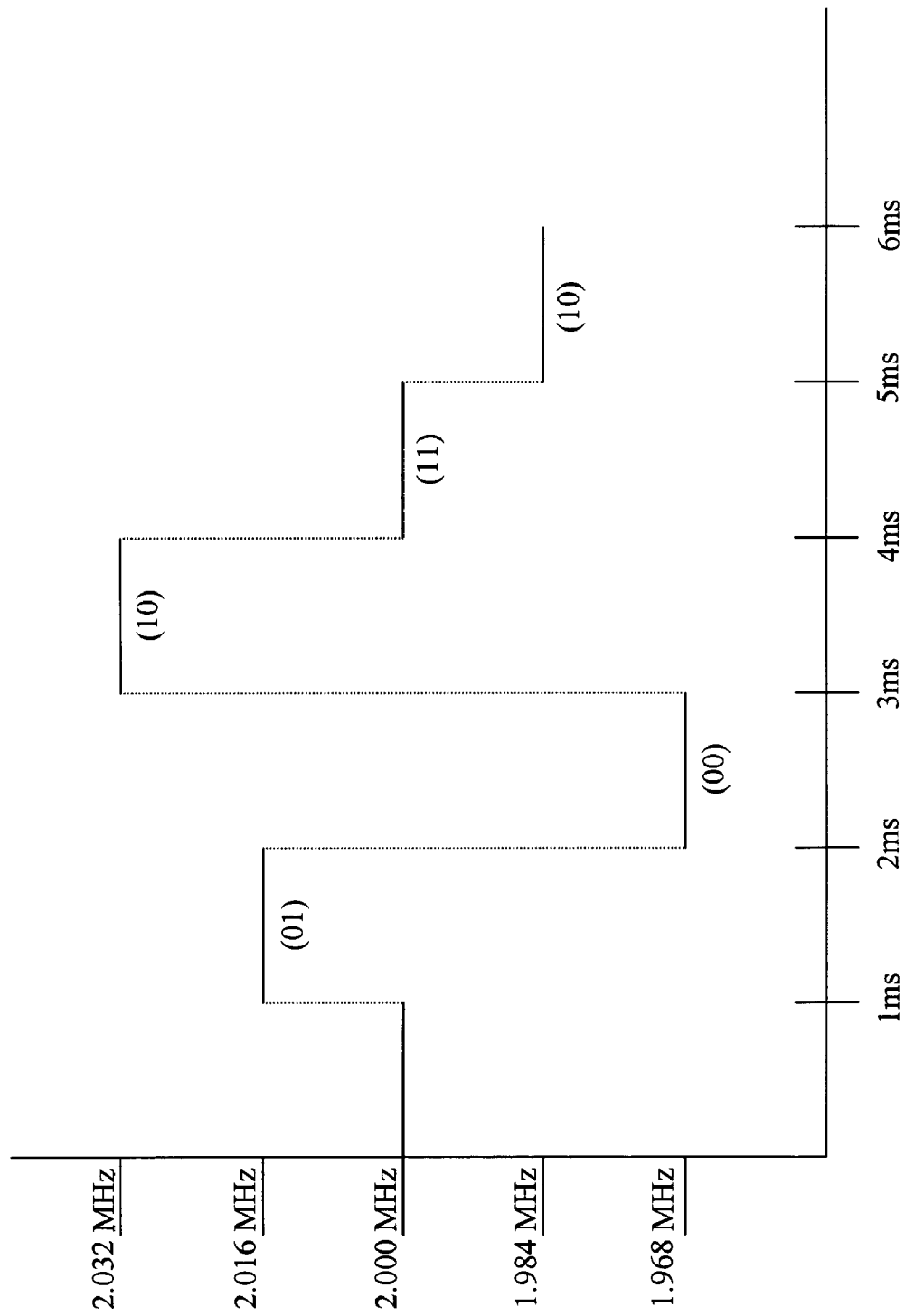
FIG. 3 is a representation of an embodiment of the present invention showing a series of five encoding frequencies included in a secondary signal backscattered by a remote communication device.

For example, FIG. 3 shows a frequency hopping scheme of one embodiment of the present invention. In this embodiment of the present invention, the remote communication device has been modulating at 2.000 MHz and has an identification bandwidth from 2.032 MHz to 1.968 MHz. The remote communication device can be instructed to modulate the antenna at one of five prescribed frequencies, in steps of about 16 kHz up and down the band from 2.000 MHz. Each change in frequency corresponds to two bits of binary information according to the following scheme: +16 kHz=01; +32 kHZ=00; −16 kHz=10; −32 kHz=11. As a result, in this Example, n is 2 and the modulation frequency is 2.000 MHz. Note, the difference between each encoding frequency may not be exactly a multiple of 16 kHz. Since a change from one encoding frequency to another encoding frequency were made by shifting the secondary frequency some percentage up or down, this causes steps to a higher frequency to be larger than steps to lower frequencies.

Following this scheme in FIG. 3, the jump at 1 ms from 2.000 MHz to 2.016 MHz corresponds to the two bits "01", the second jump up 32 kHz at 2 ms corresponds to the data set "00". As is illustrated by this jump, the cycle of five frequencies is repeating such that a jump "up" from 2.016 MHz reaches the highest frequency in the set and continues at the lowest. This method allows the remote communication device tag to "scroll" through the encoding frequencies within the identification bandwidth associated with the remote communication device such that there are always two encoding frequencies "up" and two encoding frequencies "down" that correspond to predetermined sets of binary information. Thus, in the example in FIG. 3 after 4 ms one byte of data has been communicated corresponding to "01001011".

Example 2

In another example, a remote communication device has been modulating at 2.000 MHz. It is instructed to modulate the antenna at one of five prescribed frequencies, in steps of about 8 kHz up and down the band from 2.000 MHz. Each change in frequency corresponds to two bits of binary information according to the following scheme: +8 kHz=01; +16 kHz=00; −8 kHz=10; −16 kHz=11. Since a change from one encoding frequency to another encoding frequency were made by shifting the secondary frequency some percentage up or down, this causes steps to a higher frequency to be larger than steps to lower frequencies.

Similar to the procedure described in Example 1, a jump at 1 ms from 2.000 MHz to 2.008 MHz corresponds to the two bits "01", a second jump up 16 kHz at 2 ms corresponds to the data set "00", and so forth. The cycle of five frequencies is repeating and allows the remote communication device to scroll through the encoding frequencies within the identification bandwidth associate with the remote communication device such that there are always two frequencies "up" and two frequencies "down" which correspond to predetermined sets of binary information.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

I claim:

1. A remote communication device comprising:
   an antenna operable to receive and backscatter a carrier signal, wherein the backscattered carrier signal further comprises a secondary signal having frequencies within an identification bandwidth that is selected from a plurality of distinct identification bandwidths based on information in the received carrier signal; and
   a signal processing circuit coupled to the antenna, the signal processing circuit comprising at least one encoding circuit operable to encode binary data into the backscattered carrier signal by periodically modulating the frequency of the secondary signal from one encoding frequency to another one of $2^n+1$ encoding frequencies within the identification bandwidth, wherein
   n is an integer greater than or equal to 1, and wherein
   binary data is encoded into the backscattered carrier signal without any delay resultant from simultaneous backscattered signals of other remote communication devices.

2. The remote communication device of claim 1, wherein n represents the number of bits of data encoded by a change from one encoding frequency to another encoding frequency.

3. The remote communication device of claim 1, wherein the carrier signal and the secondary signal comprise radio frequency signals.

4. The remote communication device of claim 1, wherein n is an integer from 1 to 5.

5. The remote communication device of claim 1, wherein the antenna and the signal processing circuit are configured to generate a supply voltage from the carrier signal.

6. The remote communication device of claim 1, wherein the signal processing circuit is further operable to activate and deactivate upon receipt of remote activation and deactivation signals, respectively.

7. The remote communication device of claim 1, further comprising a sensor coupled to the signal processing circuit, wherein the signal processing circuit is further operable to receive a sensor signal from the sensor, encode the sensor signal, and include the encoded sensor signal in the secondary signal.

8. A reader comprising:
   an antenna operable to receive a plurality of backscattered signals from a plurality of remote communication devices, wherein
   each backscattered signal comprises a carrier signal and a secondary signal, wherein the secondary signal comprises a series of up to $2^n+1$ encoding frequencies within an identification bandwidth of a plurality of distinct identification bandwidths; and
   a receiving circuit coupled to the antenna operable to extract data from each of the backscattered signals from two or more remote communications devices simultaneously by converting a change from one encoding frequency to another encoding frequency in the secondary signal of each backscattered signal into n bits of binary data, wherein
   n is an integer greater than or equal to 1, and wherein
   the receiving circuit is operable to extract data simultaneously from each of the backscattered signals, the secondary signal of each backscattered signal comprising encoding frequencies within an identification bandwidth that is different for each of the remote communications devices.

9. The reader of claim 8, wherein the backscattered signal comprises radio frequency signals.

10. The reader of claim 8, wherein the receiving circuit comprises at least one processing circuit operable to extract data from each of the backscattered signals, wherein each at least one processing circuit is operable to process a secondary signal within a predetermined identification bandwidth.

11. The reader of claim 8, wherein n is an integer from 1 to 5.

12. The reader of claim 8, further comprising a transmitting circuit coupled to the antenna, wherein the transmitting circuit is operable to transmit a carrier signal to the plurality of remote communication devices.

13. The reader of claim 12, wherein the antenna comprises a transmitting antenna coupled to the transmitting circuit and a receiving antenna coupled to the receiving circuit.

14. The reader of claim 12, wherein the transmitting circuit is operable to transmit a carrier signal that regularly hops to a different frequency.

15. The reader of claim 8, wherein the receiving circuit oversamples each of the backscattered signals and extracts data therefrom.

16. The reader of claim 8, further comprising:
   a transmitting circuit coupled to the reader antenna, wherein the transmitting circuit and the reader antenna are operable to transmit a carrier signal to the plurality of remote communication devices, the transmitting circuit further operable to provide a global command that is modulated onto the carrier signal, the global command instructing each remote communication device within receiving range of the antenna to each use a set of encoding frequencies that are different for each remote communication device.

17. A communication system comprising:
   a plurality of remote communication devices,
   wherein
      each remote communication device comprises:
         a remote communication device antenna operable to receive and backscatter a carrier signal, wherein the backscattered carrier signal further comprises a secondary signal having frequencies within an identification bandwidth that is selected from a plurality of distinct identification bandwidths; and
         a signal processing circuit coupled to the remote communication device antenna, the signal processing circuit comprising at least one encoding circuit operable to encode binary data into the backscattered carrier signal by periodically modulating the frequency of the secondary signal from one to another one of $2^n+1$ encoding frequencies within the selected identification bandwidth, and a reader comprising:
- a reader antenna operable to receive the plurality of backscattered carrier signals from the plurality of remote communication devices, and
- a receiving circuit coupled to the reader antenna operable to extract data from each of the backscattered carrier signals from two or more remote communications devices at least partially simultaneously by converting change from one encoding frequency to another encoding frequency in the secondary signal of each backscattered carrier signal into n bits of binary data, wherein n is an integer greater than or equal to 1, and wherein the receiving circuit of the reader is operable to extract data simultaneously from each of the backscattered signals, the secondary signal of each backscattered signal comprising encoding frequencies within an identification bandwidth that is different for each of the remote communications devices.

18. The communication system of claim 17, wherein the receiving circuit of the reader comprises at least one processing circuit operable to extract data from each of the backscattered signals, wherein each at least one processing circuit is operable to process a secondary signal within a predetermined identification bandwidth.

19. The communication system of claim 17, wherein the reader further comprises a transmitting circuit coupled to the reader antenna, wherein the transmitting circuit and the reader antenna are operable to transmit a carrier signal to the plurality of remote communication devices.

20. The communication system of claim 19, wherein the reader antenna comprises a transmitting antenna coupled to the transmitting circuit and a receiving antenna coupled to the receiving circuit.

21. The communication system of claim 19, wherein the transmitting circuit and the reader antenna are operable to transmit a carrier signal that regularly hops to a different frequency.

22. The communication system of claim 17, wherein the carrier signal and the backscattered carrier signal comprise radio frequency signals.

23. The communication system of claim 17, wherein the remote communication device antenna and the signal processing circuit are configured to generate a supply voltage from the carrier signal.

24. The communication system of claim 17, wherein the signal processing circuit of the remote communication devices is further operable to activate and deactivate upon receipt of remote activation and deactivation signals, respectively.

25. The communication system of claim 17, wherein the remote communication devices further comprise a sensor coupled to the signal processing circuit, wherein the signal processing circuit is further operable to receive a sensor signal from the sensor, encode the sensor signal, and include the encoded sensor signal in the secondary signal.

26. The communication system of claim 17, wherein n is an integer from 1 to 5.

27. A method for communication between a remote communication device and a reader comprising:
- transmitting a carrier signal from the reader;
- receiving the carrier signal at two or more remote communication devices;
- selecting, at each remote communication device, a set of encoding frequencies, from a plurality of sets of encoding frequencies, that are to be used to encode data;
- backscattering the carrier signal at each remote communication device, wherein the backscattered carrier signal further comprises a secondary signal within an identification bandwidth that is selected from a plurality of distinct identification bandwidths;
- encoding binary data into the backscattered signal at each remote communication device by periodically modulating the secondary signal from one to another of the selected encoding frequencies within the identification bandwidth;
- simultaneously receiving the backscattered carrier signals from at least two remote communication devices at a reader; and
- extracting data from each backscattered carrier signal.

28. The method of claim 27, wherein the step of extracting data from the backscattered carrier signal comprises removing the carrier signal and converting each change from one encoding frequency to another encoding frequency of the selected set of encoding frequencies into binary data.

29. The method of claim 27, wherein the binary data encoded into the backscattered carrier signal is provided by a sensor.

30. The method of claim 27, wherein the step of transmitting a carrier signal comprises regularly hopping the carrier signal to a different frequency.

31. The method of claim 27, wherein each set of encoding frequencies includes $2^n+1$ encoding frequencies within the identification bandwidth n is an integer from 1 to 5 representing the number of bits that are encoded in each change from one encoding frequency to another encoding frequency.

32. The method of claim 27, wherein the step of receiving the backscattered carrier signal comprises receiving a plurality of backscattered carrier signals from a plurality of remote communications devices, and
wherein the step of extracting data from the backscattered carrier signal comprises extracting data simultaneously from each of the plurality of backscattered signals.

33. The method of claim 27, wherein the step of selecting a set of encoding frequencies is based on a random jump between sets of encoding frequencies.

34. A method for receiving data from a plurality of remote communication devices at a reader comprising:
- transmitting a carrier signal to at least a first remote communications device and a second remote communications device;
- receiving backscattered signals from each remote communication device, each backscattered signal comprising a secondary signal having frequencies within an identification bandwidth that is selected from a plurality of distinct identification bandwidths, the secondary signal comprising a set of encoding frequencies; and
- extracting data from each received signal, wherein data is extracted simultaneously from each of the backscattered signals, the secondary signal of each backscattered signal comprising encoding frequencies within an identification bandwidth that is different for each of the remote communications devices.

35. The method of claim 34, wherein the step of extracting data from each backscattered carrier signal comprises removing the carrier signal and converting each change from one encoding frequency to another encoding frequency in the secondary signal into binary data.

36. The method of claim 34, wherein the binary data encoded into each backscattered carrier signal is provided by a sensor.

37. The method of claim 34, wherein the step of transmitting a carrier signal comprises instructing each of the first and second remote communications devices to use a selected set of encoding frequencies.

38. The method of claim 34, wherein the step of transmitting a carrier signal comprises regularly hopping the carrier signal to a different frequency.

39. The method of claim 34, wherein each set of encoding frequencies includes $2^n+1$ encoding frequencies within the identification bandwidth n is an integer from 1 to 5 representing the number of bits that are encoded in each change from one encoding frequency to another encoding frequency.

* * * * *